(12) United States Patent
Weis

(10) Patent No.: US 10,286,441 B2
(45) Date of Patent: May 14, 2019

(54) FEED DEVICE AND SUCCESSIVE FEED METHOD

(71) Applicant: Mall + Herlan Schweiz AG, Weinfelden (CH)

(72) Inventor: Manfred Weis, Radolfzell (DE)

(73) Assignee: MALL + HERLAN SCHWEIZ AG, Weinfelden Schweiz (CH)

( * ) Notice: Subject to any disclaimer, the term of this patent is extended or adjusted under 35 U.S.C. 154(b) by 925 days.

(21) Appl. No.: 14/768,896

(22) PCT Filed: Jan. 22, 2014

(86) PCT No.: PCT/EP2014/051206
§ 371 (c)(1),
(2) Date: Aug. 19, 2015

(87) PCT Pub. No.: WO2014/127949
PCT Pub. Date: Aug. 28, 2014

(65) Prior Publication Data
US 2015/0375289 A1    Dec. 31, 2015

(30) Foreign Application Priority Data

Feb. 21, 2013  (DE) .................... 10 2013 202 879

(51) Int. Cl.
| | |
|---|---|
| *B21D 43/00* | (2006.01) |
| *B08B 9/42* | (2006.01) |
| *B08B 9/32* | (2006.01) |
| *B67C 3/24* | (2006.01) |
| *B65G 29/00* | (2006.01) |
| *B21D 51/26* | (2006.01) |

(52) U.S. Cl.
CPC ............... *B21D 43/00* (2013.01); *B08B 9/32* (2013.01); *B08B 9/42* (2013.01); *B21D 51/2638* (2013.01);
(Continued)

(58) Field of Classification Search
CPC .. B08B 9/32; B65B 3/24; B65B 43/60; B65C 3/16; F41A 9/02; B21D 43/00;
(Continued)

(56) References Cited

U.S. PATENT DOCUMENTS 3,978,968 A * 9/1976 Rose .................... F41A 9/02
198/339.1
5,509,524 A * 4/1996 Ohmori .................. B65B 43/60
198/465.1

(Continued)

FOREIGN PATENT DOCUMENTS

BE        882171 A1    9/1980
CN    101472812 A    7/2009
(Continued)

*Primary Examiner* — David B Jones
(74) *Attorney, Agent, or Firm* — Ware, Fressola, Maguire & Barber LLP

(57) ABSTRACT

A feed apparatus for successive processing of hollow bodies at processing stations which are arranged in a ring-shaped manner, to a necking machine for successive processing of hollow bodies, to a method for successive feeding of hollow bodies at processing stations which are arranged in a ring-shaped manner, and to a corresponding computer program. In order to allow a relatively large number of processing stations to be provided, without there being an excessive space requirement or similarly inefficient resource utilization, a feed apparatus is proposed for successive processing of hollow bodies at processing stations which are arranged in a ring-shaped manner, having a first circulating guide for first processing stations and a second circulating guide for second processing stations, one of the guides being arranged within the other guide, and having a moving unit for moving a hollow body into the first guide and/or the second guide.

7 Claims, 3 Drawing Sheets

(52) U.S. Cl.
CPC ............... *B65G 29/00* (2013.01); *B67C 3/24* (2013.01); *B21D 51/26* (2013.01); *B65G 2201/0252* (2013.01)

(58) Field of Classification Search
CPC .... B21D 51/2638; B21D 51/26; B65G 29/00; B65G 2201/0252
USPC .......................................................... 72/428
See application file for complete search history.

(56) References Cited

U.S. PATENT DOCUMENTS

| | | | | |
|---|---|---|---|---|
| 5,713,403 | A | * | 2/1998 | Clusserath ................ B65C 3/16 141/101 |
| 6,772,806 | B2 | * | 8/2004 | De Villele ................ B65B 3/24 141/103 |
| 2009/0159152 | A1 | * | 6/2009 | Till .......................... B08B 9/32 141/145 |

FOREIGN PATENT DOCUMENTS

| | | |
|---|---|---|
| CN | 202272451 U | 6/2012 |
| CN | 202612417 U | 12/2012 |
| DE | 30 09 114 A1 | 9/1980 |
| DE | 10 2004 017737 A1 | 11/2005 |
| DE | 10 2006 028266 A1 | 12/2007 |
| EP | 0770566 A1 | 5/1997 |
| JP | 2009-541021 A | 11/2009 |
| JP | 2012125840 A | 7/2012 |

* cited by examiner

FEED DEVICE AND SUCCESSIVE FEED METHOD

CROSS REFERENCE TO RELATED APPLICATIONS

This application is the U.S. National Stage of International Application Number PCT/EP2014/051206 filed on Jan. 22, 2014 which application claims priority under 35 USC § 119 to German Patent Application No. 10 2013 202 879.2 filed on Feb. 21, 2013. Both applications are hereby incorporated by reference in their entirety.

TECHNICAL FIELD

The invention relates to a feed apparatus for successive processing of hollow bodies at processing stations which are arranged in a ring-shaped manner, to a necking machine for successive processing of hollow bodies, to a method for successive feeding of hollow bodies to processing stations which are arranged in a ring-shaped manner, and to a corresponding computer Program.

BACKGROUND OF THE INVENTION

Cyclical necking machines for producing, for example, metal hollow bodies are currently used predominantly in a horizontal design, that is to say the working movement takes place substantially horizontally, modified vertical presses having been used at the starts of the drawing-in operation.

The cans (as one example of a metal hollow body) are conventionally as a rule fed to the machine, coming from below via a belt (for practical considerations, since other regions then remain more readily accessible) via a feed device (as a rule, a vacuum drum), are transferred from there into a holding apparatus which for its part is positioned on a rotary table which is driven cyclically in a synchronous manner with respect to the working process. The can is thus fed to the different working stages one after another, until finally all processing steps which are provided in the machine have been executed. Finally, the can is removed from the working region of the machine via a discharging device which is comparable with the feed apparatus, and are transferred via a belt to the next machine.

Machines having rotary tables of between 20 and 48 stations are currently offered and operated commercially, 50 stations already having been provided.

The smaller machines come from the time when the metal containers were made from Al99.5 and only a shoulder was shaped which served to draw in the can diameter down to the diameter possessed by the valve to be attached, in the exemplary case of aerosol cans. With increasing diameters of the containers and increasingly complex shapes, larger machines were developed, by way of which these requirements should be met in a machine, since only a certain degree of deformation (ultimately a change in diameter) can be achieved per deforming step. More complicated or greater deformation therefore requires more stations.

In later years, the containers made from Al99.5 were joined by containers made from alloyed aluminum or else from steel with relatively thin wall thicknesses (called "thin-walled containers"). As a result of the material properties, the degrees of deformation which can be achieved here per stage are only approximately half as great at most, however, with the result that at least twice as many stations are required for the same shape in comparison with an identical "thick-walled" container made from Al99.5.

There is therefore the fundamental aim for it to be possible to provide a greater number of stations for a drawing-in operation.

According to the current prior art, a first approach consists in combining a plurality of (small) known machines with one another (that is to say, in series).

One disadvantage of said first approach consists in that a comparatively large amount of space is required, a further disadvantage lying in the high costs per station, since most of the components have to be provided multiple times. Furthermore, the operation of a plurality of machines also results in a higher energy requirement, which has an unfavorable effect on the environmental balance of the hollow body. It is disadvantageous, furthermore, that the cans have to be removed from the holding chucks at the exit of a machine and have to be received again in the following machine; said receiving should ideally be performed in exactly the same position in relation to the chuck as previously, since otherwise the orientation of the hollow body with respect to its longitudinal axis would undesirably be lost (rotation of the hollow body would therefore occur). A further complexity consists in that the machines are synchronized or are decoupled to a sufficient extent by way of small buffer storage sections. Said buffer storage sections are, for example, bowl feeders, in which the cans are positioned in a merely very restrictedly arranged manner. Furthermore, each machine transfer increases the risk of damage to the hollow body and therefore an increase in the rejects.

A second known approach consists in providing larger and larger machines; 50 stations on one rotary table in the near future.

This approach reaches its limits in conjunction with the manageable handling and the moving masses, the feasible number of stations nevertheless being unsatisfactory for a number of products, in particular from the field of thin-walled containers. A particular problem consists in that the transverse acceleration on the machine increases considerably during rotation of the rotary table with an increasing size; said movement can be compensated for only in a very complicated manner, since it is intermittent.

SUMMARY OF THE INVENTION

An object, in view of which the present invention has been made, consists in providing a feed apparatus for successive processing of hollow bodies at processing stations which are arranged in a ring-shaped manner, a necking machine for successive processing of hollow bodies, a method for successive feeding of hollow bodies at processing stations which are arranged in a ring-shaped manner, and a corresponding computer program, which allow a number of processing stations to be provided which reaches and exceeds the number which can be achieved by way of the second approach, without there being an excessive space requirement or similarly inefficient resource utilization in accordance with the first approach.

According to the invention, in view of this object, a feed apparatus for successive processing of hollow bodies at processing stations which are arranged in a ring-shaped manner is proposed, having a first circulating guide for first processing stations and a second circulating guide for second processing stations, one of the guides being arranged within the other guide, and a moving unit for moving a hollow body into the first guide and/or the second guide.

A necking machine for successive processing of hollow bodies is likewise proposed, having a feed apparatus according to the invention and processing stations for hollow bodies which are configured for feeding hollow bodies by means of the feed apparatus, the processing stations being arranged on a first ring in a manner which corresponds to the first guide and a second ring in a manner which corresponds to the second guide.

In addition, a method for successive feeding of hollow bodies at processing stations which are arranged in a ring-shaped manner is proposed, with a step of moving a hollow body into a first guide and/or a second guide, the first guide being a first circulating guide for first processing stations and the, second guide being a second circulating guide for second processing stations, one of the guides being arranged within the other guide, the step of moving being carried out multiple times, and the multiple moving comprising moving of a hollow body into the first guide and moving of a hollow body into the second guide.

Furthermore, a computer program product is proposed having a computer program which causes a feed apparatus according to the invention or a necking machine according to the invention to perform a method according to the invention when the computer program is executed on the feed apparatus or the necking machine.

The invention is based on the finding that improved space utilization can be achieved by way of an arrangement of the processing stations on rings, of which one is situated in another, than by way of an arrangement of complete machines next to one another. Since, in addition, essential elements of the entire arrangement can be utilized jointly for the plurality of rings of processing stations, the mechanical complexity per station is likewise lower in comparison with the first approach. Instead of the size of a single ring, in which processing stations are arranged, being increased by way of an increase in its diameter, the invention provides in the case of an increase in the number of stations that the path which runs through the stations is "convoluted" on a comparatively small area, via a plurality of parallel rings of processing stations being supplied with hollow bodies. If there is a desire to obtain a higher throughput per machine, the rings of the processing stations can also be utilized in parallel with a correspondingly higher throughput.

In the present case, the term of "guide" relates to devices for holding and moving one or a plurality of hollow bodies along a predefined track, a rotary table, in particular, being one example of a guide. The predefined track of a guide can, for example, also be defined by rail elements which enclose the track. Even if two guides are provided with rail elements of this type per se separately from one another, this does not rule out that an outer limit of an inner track and an inner limit of the outer track are defined at the same time by a correspondingly configured rail element, with the result that the rail element can be attributed at least partially to both guides.

It is to be noted that the present invention is not restricted to merely two guides being provided. It is also possible to provide a larger number of guides, for example three guides. If three or more guides are Provided, this can be brought about in such a way that a second guide is arranged within a first guide (as has already been described above, for example), the third guide being arranged within the second guide. In this arrangement, the guides can be arranged concentrically. It is likewise possible, however, to provide the second and third guide next to one another within the first guide. Corresponding variations arise in the case of an even greater number of existing guides.

In one embodiment of the invention, the moving unit is configured for moving a hollow body, respectively, from the first guide into the second guide and from the second guide into the first guide.

It is an advantage of said embodiment that the moving unit which is configured in this way permits the moving of hollow bodies, for example, from an outer guide onto an inner guide and back, it being possible for feeding and discharging per se of hollow bodies to/from the apparatus according to the invention to take place substantially in a usual way, in particular in the form of a feed and a discharge to the outer guide, within which at least one inner guide is provided.

It is likewise possible, however, to provide feed and discharge of hollow bodies to/from the apparatus according to the invention in conjunction with different guides. Thus, for example, a hollow body can be fed to an outer guide, can be moved from the outer guide to an inner guide by way of a moving unit after passing through a typically almost complete revolution, and, once again after passing through a typically almost complete revolution on the inner guide, can be discharged by the latter out of the apparatus. A reversal of this sequence or further modifications or combinations of guide sequences are likewise possible.

In one refinement of the above embodiment, the first guide is provided separately from the second guide.

If the first and the second guide are provided separately from one another, that is to say are realized, for example, in the form of (substantially) independent rotary tables, the different guides can be stepped with angular steps which differ from one another, with the result that different numbers of processing stations can also be provided for different guides. A temporally constant offset between respective cycle steps of the guides can be addressed by way of a corresponding hold period of the moving unit.

In one development of the refinement, the moving unit has a first moving element for moving a hollow body from the first guide into the second guide and a second moving element for moving a hollow body from the second guide into the first guide.

Geometric restrictions can arise depending on the design of the guides which are separate from one another, which geometric restrictions necessitate increased construction or control outlay in the case of a single-piece moving unit which can move both hollow bodies from the first guide into the second guide and from the second guide into the first guide. If the moving unit is of multiple-piece configuration, however, the first and the second moving element being provided separately from one another, any possible geometric restrictions can be addressed more simply.

In one modification of the refinement or its development, the first guide and the second guide are configured for a movement in opposite directions.

In the case of a movement in opposite directions of the guides, in particular in the case of a movement in opposite directions of the guides which is synchronized with regard to the steps or cycles, transverse accelerations or forces or torques which would otherwise occur within the apparatus are compensated for at least partially by way of the movement in opposite directions, with the result that firstly a reduction in further measures in view of the accelerations, forces or moments which occur becomes possible (for example, the mechanical requirements can be reduced) and secondly smoother operation of the apparatus arises, which in turn has a positive effect on the quality during processing of the hollow bodies, for example during drawing in.

In a further refinement of the embodiment, the first guide and the second guide are contained in a common guide unit.

According to the invention, different guides can be realized, for example, in the form of a (common) rotary table which has, as an integral unit, two or more guide tracks, between which hollow bodies can be moved. In a case of this type, the identical number of stations in an inner and outer ring of processing stations results in different spacings between the processing stations of the different rings.

In another embodiment, the moving unit is configured for, in particular, parallel feeding of a first hollow body into the first guide and a second hollow body into the second guide and, in particular, parallel removal of the first hollow body from the first guide and the second hollow body from the second guide, the first guide and the second guide preferably being configured for a movement in opposite directions.

If a plurality of (that is to say, two or else a higher number of) guides are operated in parallel, the throughput of a corresponding apparatus can be increased correspondingly.

In a moving unit in the form of a common, integral feed and discharging apparatus for the first and second guide, the simplest case results in a relation between the number of usable stations for the first guide and the second guide in such a form that an identical number of stations is provided or there is an integral ratio between the stations. If, for example, two hollow bodies are fed to the outer guide or discharged from the latter for each hollow body which is fed to the inner guide or is discharged from the latter, double the number of processing stations can correspondingly be serviced by the outer guide.

The moving unit can also be of multiple-piece configuration in this embodiment, it being possible for an independent feed and discharge number to be provided for the guides in the case of a multiple-piece embodiment, which permits a corresponding selection of the respective processing stations.

In the case of a movement in opposite directions of the guides, the advantages which are described here for the above embodiment also arise in a corresponding configuration of this embodiment.

BRIEF DESCRIPTION OF THE DRAWINGS

The invention will be explained in the following text with reference to illustrative exemplary embodiments and the appended figures, in which.

DETAILED DESCRIPTION

Figure 1:
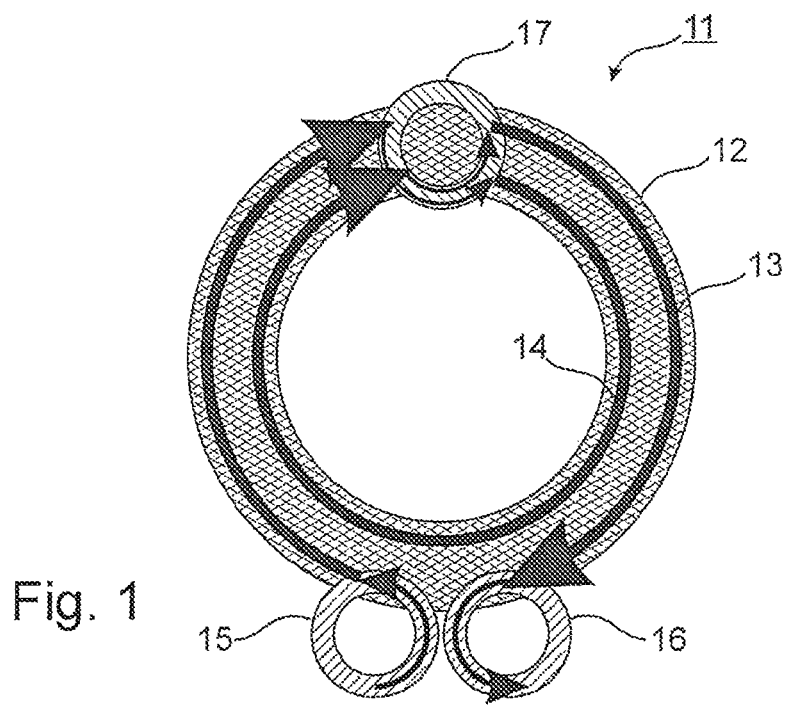
FIG. 1 shows a diagrammatic illustration of a first exemplary embodiment of a necking machine according to the invention having a feed apparatus according to the invention.

FIG. 1 shows a diagrammatic illustration of a first exemplary embodiment of a necking machine according to the invention having a feed apparatus according to the invention.

The necking machine 11 comprises a rotary table 12 with a first guide 13 and a second guide 14, the second guide 14 being arranged within the first guide 13. Furthermore, the necking machine 11 has a feed element 15 and a discharge element 16 for the first guide 13 and a moving unit 17 for moving hollow bodies from the first guide 13 to the second guide 14 and from the second guide 14 to the first guide 13.

Furthermore, the necking machine 11 comprises a number of processing stations (not shown), a hollow body being guided, respectively, by the guides 13, 14 successively to the processing stations.

A hollow body (not shown) to be processed is fed by the feed element 15 of the first guide 13 and is fed by the latter in the clockwise direction, respectively, one after another in a stepped manner to the processing stations which are situated on this path, until the moving unit 17 is reached. The moving unit 17 moves the hollow body which has already been processed partially from the first guide 13 to the second guide 14, with the result that the second guide 14 feeds the hollow body (still in the clockwise direction) to the further processing stations which are serviced by the second guide 14, until the hollow body has performed one revolution in the second guide 14 and is moved (back) from the second guide 14 to the first guide 13 by the moving unit 17, in order to further run through the revolution with the first guide 13. The hollow body which is fed to the respective processing stations one after another in this way is finally removed from the first guide 13 and forwarded by the discharge unit 16.

In this exemplary embodiment, the moving unit 17 is provided on a side of the rotary table 12 which lies opposite the feed unit 15 and the discharge unit 16, the invention not being restricted hereto. The moving between the guides 13, 14 can also be provided at another relative position. The feed unit 15 and the discharge unit 16 are arranged adjacently in order to utilize the available space and the possible number of stations.

Figure 2:
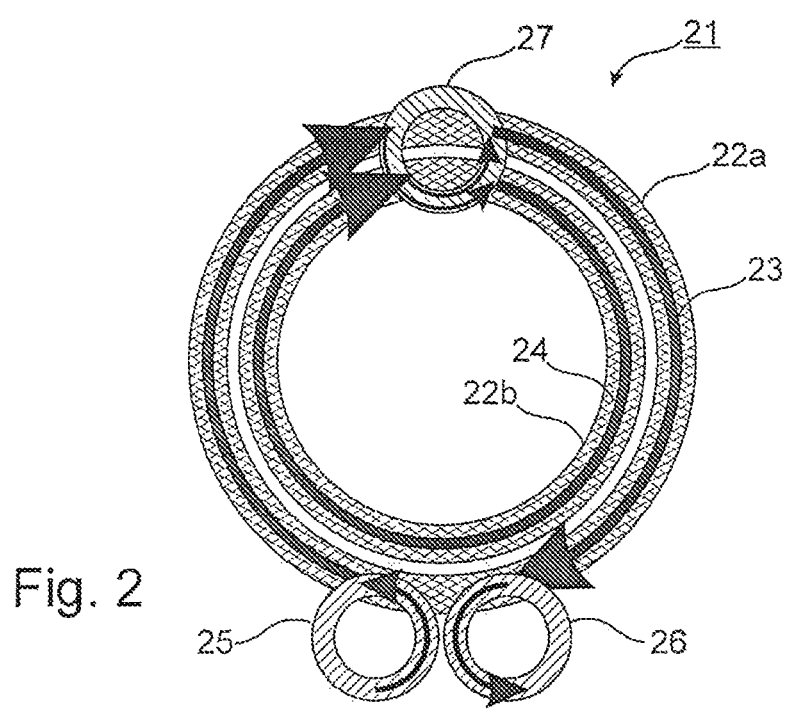
FIG. 2 shows a diagrammatic illustration of a second exemplary embodiment of a necking machine according to the invention having a feed apparatus according to the invention.

FIG. 2 shows a diagrammatic illustration of a second exemplary embodiment of a necking machine according to the invention having a feed apparatus according to the invention.

The necking machine 21 of the second exemplary embodiment comprises a first guide 23 and a second guide 24 which is arranged within the first guide 23. Two rotary tables 22a, 22b are provided here. Just like the necking machine of the first exemplary embodiment, the necking machine 21 has a feed unit 25, a moving unit 27 and a discharge unit 26.

The necking machine 21 of the second exemplary embodiment differs from that of the first exemplary embodiment in that separate rotary tables 22a, 22b are provided instead of the common rotary table for the first guide 23 and the second guide 24. This allows the number of stations to be serviced and therefore the cycle or step rate for the first guide 23 and the second guide 24 to be set independently of one another or at least differently.

In principle, the function and operation of the necking machine 21 of the second exemplary embodiment corresponds to those of the first exemplary embodiment, with the result that a corresponding repetition of the above text is not necessary.

In this exemplary embodiment, the rotational direction of the rotary table 22a of the first guide 23 corresponds to that of the rotary table 22b of the second guide. It is also possible, however, as long as the geometric conditions of the respective refinement allow it, to operate the rotary tables or guides in opposite directions.

Figure 3:
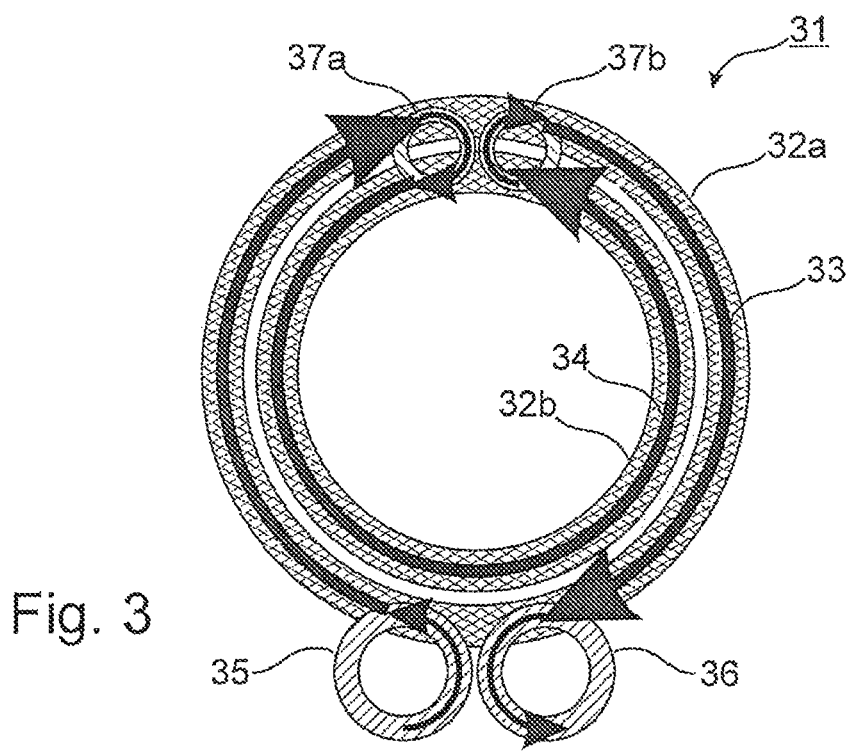
FIG. 3 shows a diagrammatic illustration of a third exemplary embodiment of a necking machine according to the invention having a feed apparatus according to the invention.

FIG. 3 shows a diagrammatic illustration of a third exemplary embodiment of a necking machine according to the invention having a feed apparatus according to the invention.

In a comparable manner to that of the second exemplary embodiment, the necking machine 31 of the third exemplary embodiment comprises two guides 33, 34 with dedicated rotary tables 32a, 32b, the second guide 34 being arranged within the first guide 33. In addition, the necking machine likewise comprises a feed unit 35 and a discharge unit 36 which feed hollow bodies to the first guide 34 and discharge them from it In a deviation from the second exemplary embodiment, the necking machine 31 of the third exemplary embodiment comprises a multiple-piece moving unit with a first moving element 37a and a second moving element 37b, the rotational direction of the first guide 33 additionally being opposed to the rotational direction of the second guide 34.

The first moving element 37a serves to move hollow bodies on their passage through the necking machine 31 from the first guide 33 to the second guide 34, whereas the second moving element 37b serves to move hollow bodies from the second guide 34 to the first guide 33 again after passage through the stations which are serviced by the second guide 34.

Figure 4:
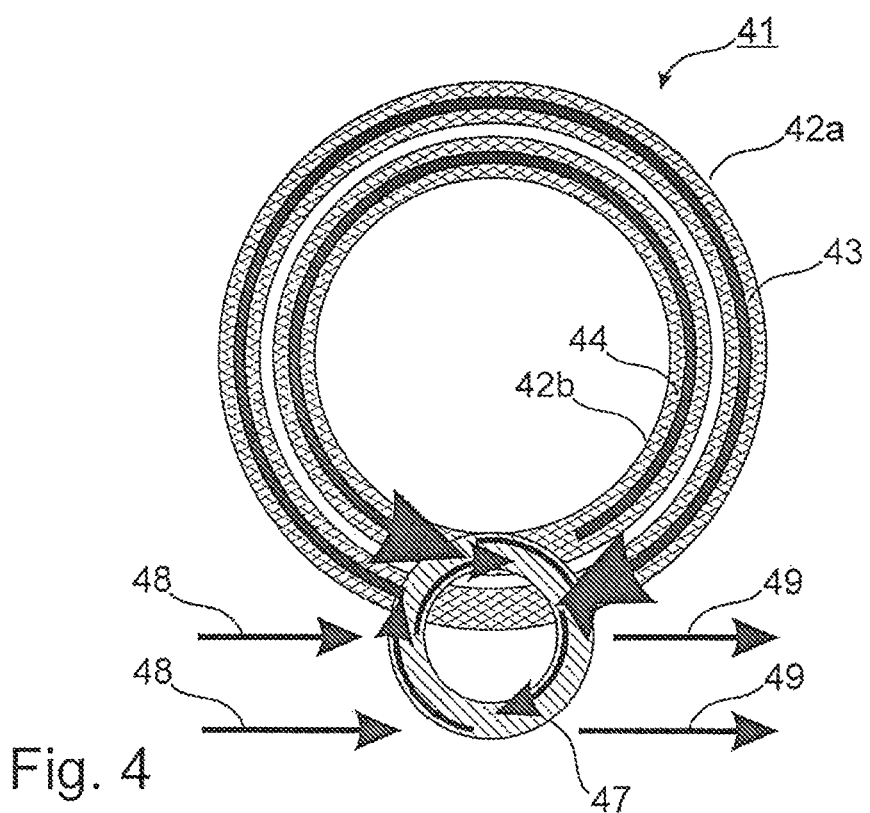
FIG. 4 shows a diagrammatic illustration of a fourth exemplary embodiment of a necking machine according to the invention having a feed apparatus according to the invention.

FIG. 4 shows a diagrammatic illustration of a fourth exemplary embodiment of a necking machine according to the invention having a feed apparatus according to the invention.

In a similar manner to those of the second and third exemplary embodiment, the necking machine 41 of the fourth exemplary embodiment comprises separate rotary tables 42a, 42b for a first guide 43 and a second guide 44.

In a deviation from the first three exemplary embodiments, the necking machine 41 comprises a moving unit 47 which feeds hollow bodies which are fed together to the first guide 43 and the second guide 44, the quantity of hollow bodies which are fed being doubled in this way in comparison with the first three exemplary embodiments, which is indicated by way of arrows 48.

The hollow bodies which are fed in parallel to the guides 43, 44 run in parallel through the necking machine 41 and are again removed and discharged in parallel after one revolution by the moving unit 47 of the first guide 43 and the second guide 44 (see arrows 49).

Figure 5:
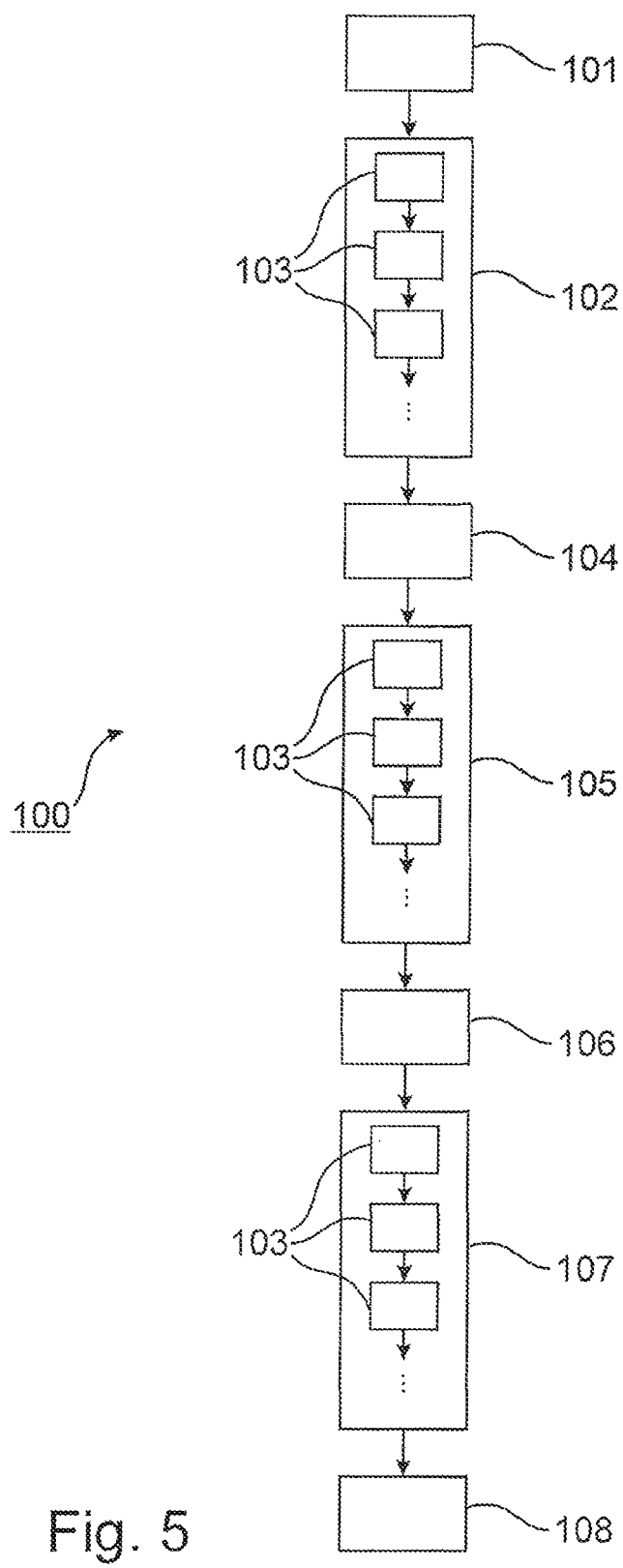
FIG. 5 shows a diagrammatic flow chart for the passage of a hollow body in conjunction with one exemplary embodiment of a method according to the invention.

FIG. 5 shows a diagrammatic flow chart for the passage of a hollow body in conjunction with one exemplary embodiment of a method according to the invention.

The method 100 begins with feeding 101 of the hollow body to the first guide, after which a first processing sequence 102 follows which comprises successive feeding 103 of the hollow body to corresponding processing stations and corresponding processing. Following the first processing sequence 102, the hollow body is moved into the second guide in step 104, the second guide being arranged within the first guide. The moving 104 differs from the known removals from a guide in conventional necking machines in that the moving 104 takes place from the outer first guide into a second guide which is arranged therein and does not represent a discharge from the necking machine. The moving 104 is followed by a second processing sequence 105 with corresponding successive feeding 103 and processing (comparable with the first processing sequence). After conclusion of the second processing sequence 105 (during which the hollow body was guided by the second guide), further moving 106 takes place from the second guide back into the first guide, after which the processing is continued with a third processing sequence 107. Finally, the hollow body which is processed by the necking machine is discharged in step 108.

One aspect of the present invention provides two tracks of chucks on one rotary table, the hollow bodies being transferred from one track (preferably the outer) to the other in one region and then being transferred back to the starting track after almost an entire revolution shortly before the transfer position is reached. Here, both tracks have the same number of stations, with the result that the spacing between the chucks on the outer track is greater than on the inner track.

In order to improve the geometric conditions during movement from one track to the other, a further aspect of the invention provides a plurality of (preferably two) rotary rings which run inside one another (preferably concentrically; preferably in opposite directions), in which the hollow bodies are transferred in one region from one (preferably outer) rotary ring to the other or another rotary ring and, from there, are returned back to the original rotary ring again after almost a complete revolution before the transfer region is reached again.

In this aspect, the number of stations on the rotary rings does not have to be identical, with the result that the space utilization is improved further. Exemplary dimensioning would be approximately 36 stations on the inside and 48 stations on the outside. If the transfers are realized on separate transfer units (for example, vacuum drums), the restrictions for the geometric design are reduced further.

As a result of rotary rings which run in opposite directions, the transverse acceleration which occurs during cycling (stepped movement) of the rotary rings is already compensated for to a very large extent, without further additional measures being necessary, with the result that the machine runs comparatively smoothly or can be of lighter construction despite a large number of stations.

In comparison with the previous approaches, a machine of this type is of considerably smaller overall size than a combination of a plurality of machines, or else than a machine with a comparable number of stations on a rotary table with one track. As a result, a machine of this type is also less expensive to construct.

In the transfers between the tracks, the hollow body is preferably never left to gravity, with the result that exact positioning in the chuck is easily possible and provisions for steadying free-falling cans again can be dispensed with.

A further aspect of the invention provides for loading the incoming hollow bodies to be drawn in into a plurality of tracks by way of a special loading apparatus and then to have a machine, in which the plurality of rotary rings are correspondingly in parallel, whereby, although a maximum increase in the number of stations for a hollow body does not arise, the machine operates with a correspondingly increased yield.

The drive of the guides (rotary tables, rotary rings) can take place via
- a mechanical stepping gear mechanism which acts directly on a ring, the movement of which is transmitted via a pinion set to another rotary table in accordance with the station ratio, one or more servo drives which act directly on a ring, the movement of which is transferred via a pinion set to another rotary table in accordance with the station ratio, or one or more servo drives per rotary ring, with the result that the rings can be controlled independently of one another.

The invention provides, in Particular, a necking machine, in which the hollow bodies are guided through the machine on two substantially concentric tracks and the hollow bodies are moved from one to the other track and, at the end of the passage on said track, back to the starting track again, the tracks preferably being run through in opposite directions, the outer track having, in particular, more stations than the inner and the moving between the tracks advantageously being realized by way of separate moving devices.

The invention also provides a necking machine having a plurality of tracks, in which tracks are loaded in parallel, with the result that a plurality of hollow bodies can be processed at parallel stations per stroke, whereby the overall throughput is increased correspondingly.

A further aspect of the invention relates to a necking machine for successive processing of hollow bodies at processing stations which are arranged in a ring-shaped manner, processing stations of the necking machine being arranged on a first ring and a second ring which is situated within the first ring, and the necking machine comprising at least one moving unit for moving a hollow body between a guide for processing stations of the first ring and a guide for processing stations of the second ring, and to a method for successive processing of hollow bodies at processing stations which are arranged in a ring-shaped manner, with successive feeding of a hollow body to processing stations of a necking machine by way of a guide, the processing stations being arranged on a first ring and a second ring which is situated within the first ring, the feeding comprising moving of a hollow body from a guide for processing stations of the first ring inward to a guide for processing stations of the second ring.

The invention has been described here principally in relation to metallic hollow bodies, as are used, for example, in the production of cans, it also being possible for the invention to be used in contexts, in which a high number of stations is not necessary (for example, plastic hollow bodies), if a plurality of objects are loaded Per cycle and correspondingly larger steps are made during "switching" ("switching" of the rotary table is spoken of when the latter is rotated further by one step).

Even if the rings, in which the processing stations are arranged, have been represented and discussed here principally as concentric rings, the present invention is not restricted hereto and refinements are also possible, in which the rings are not arranged concentrically, although a concentric arrangement is considered to be particularly advantageous.

It is possible and included in the invention that the planes of the different rings are offset relative to one another along a rotational axis, with the result that the processing stations and guides do not lie in a common plane.

The invention claimed is:

1. A feed apparatus for successive processing of hollow bodies at processing stations, including first processing stations which are arranged in a ring-shaped manner, and second processing stations which are arranged in a ring-shaped manner; the feed apparatus comprising:

a first circulating guide for said first processing stations and a second circulating guide for said second processing stations, one of the guides being arranged within the other guide, and a moving unit interconnected between the first circulating guide and the second circulating guide, the moving unit for moving a hollow body into the first guide and/or the second guide, characterized in that the first guide is provided separately from the second guide, the moving unit being configured for moving, respectively, a hollow body from the first guide into the second guide and from the second guide into the first guide.

2. The feed apparatus as claimed in claim 1, wherein the rotational direction of the first guide is additionally opposed to the rotational direction of the second guide, and wherein the moving unit has a first moving element that serves to move a hollow body from the first guide into the second guide and a second moving element that serves to move a hollow body from the second guide into the first guide.

3. A necking machine for successive processing of hollow bodies, comprising a feed apparatus for successive processing of hollow bodies at processing stations, including first processing stations which are arranged in a ring-shaped manner, and second processing stations which are arranged in a ring-shaped manner, having a first circulating guide for said first processing stations and a second circulating guide for said second processing stations, one of the guides being arranged within the other guide, and a moving unit interconnected between the first circulating guide and the second circulating guide, the moving unit for moving a hollow body into the first guide and/or the second guide, the first guide is provided separately from the second guide, the moving unit being configured for moving, respectively, a hollow body from the first guide into the second guide and from the second guide into the first guide, wherein the processing stations are configured for feeding in hollow bodies by the feed apparatus, the processing stations being arranged on a first ring in a manner which corresponds to the first guide and a second ring in a manner which corresponds to the second guide.

4. A method for successive feeding of hollow bodies at processing stations, including first processing stations which are arranged in a ring-shaped manner, and second processing stations which are arranged in a ring-shaped manner; comprising the steps of:

moving of a hollow body into a first guide and/or a second guide, the first guide being a first circulating guide for first processing stations and the second guide being a second circulating guide for second processing stations, one of the guides being arranged within the other guide, wherein the step of moving is carried out multiple times, and the multiple moving comprises moving of a hollow body into the first guide and moving of a hollow body into the second guide, characterized in that the first guide is provided separately from the second guide, the moving comprising moving, respectively, of a hollow body in from the first guide into the second guide and from the second guide into the first guide, or in that the first guide and the second guide are configured for a movement in opposite directions, the moving comprising, feeding of a first hollow body into the first guide and a second hollow body into the second guide, and removing of the first hollow body from the first guide and the second hollow body from the second guide.

5. A computer program product having a computer program which causes a feed apparatus or a necking machine to perform a method for successive feeding of hollow bodies at processing stations, including first processing stations which are arranged in a ring-shaped manner, and second processing stations which are arranged in a ring-shaped manner, said method comprising:
 moving of a hollow body into a first guide and/or a second guide,
 the first guide being a first circulating guide for first processing stations and the second guide being a second circulating guide for second processing stations, one of the guides being arranged within the other guide,
 wherein the step of moving is carried out multiple times, and the multiple moving comprises moving of a hollow body into the first guide and moving of a hollow body into the second guide,
characterized in that
 the first guide is provided separately from the second guide, the moving comprising moving, respectively, of a hollow body in from the first guide into the second guide and from the second guide into the first guide, or in that
 the first guide and the second guide are configured for a movement in opposite directions, the moving comprising feeding of a first hollow body into the first guide and a second hollow body into the second guide, and removing of the first hollow body from the first guide and the second hollow body from the second guide when the computer program is executed on the feed apparatus or the necking machine.

6. A feed apparatus for successive processing of hollow bodies at processing stations, including first processing stations which are arranged in a ring-shaped manner, and second processing stations which are arranged in a ring-shaped manner, comprising:
 a first circulating guide for said first processing stations and a second circulating guide for said second processing stations, one of the guides being arranged within the other guide, and
 a moving unit interconnected between the first circulating guide and the second circulating guide, the moving unit for moving a hollow body into the first guide and/or the second guide, characterized in that the first guide is provided separately from the second guide, and wherein the first guide and the second guide are configured for a movement in opposite directions, the moving unit being configured for feeding of a first hollow body into the first guide and a second hollow body into the second guide, and for removing of the first hollow body from the first guide and the second hollow body from the second guide.

7. A necking machine for successive processing of hollow bodies, comprising:
 a feed apparatus for successive processing of hollow bodies at processing stations, including first processing stations which are arranged in a ring-shaped manner, and second processing stations which are arranged in a ring-shaped manner, having
 a first circulating guide for said first processing stations and a second circulating guide for said second processing stations, one of the guides being arranged within the other guide, and
 a moving unit interconnected between the first circulating guide and the second circulating guide, the moving unit for moving a hollow body into the first guide and/or the second guide, characterized in that the first guide is provided separately from the second guide, and wherein the first guide and the second guide are configured for a movement in opposite directions, the moving unit being configured for feeding of a first hollow body into the first guide and a second hollow body into the second guide, and for removing of the first hollow body from the first guide and the second hollow body from the second guide,
 wherein the processing stations are configured for feeding in hollow bodies by the feed apparatus, the processing stations being arranged on a first ring in a manner which corresponds to the first guide and a second ring in a manner which corresponds to the second guide.

* * * * *